(12) United States Patent
Mishima et al.

(10) Patent No.: US 9,957,954 B2
(45) Date of Patent: May 1, 2018

(54) SOLAR THERMAL POWER GENERATION SYSTEM

(71) Applicant: Mitsubishi Hitachi Power Systems, Ltd., Nishi-ku, Yokohama (JP)

(72) Inventors: Nobuyoshi Mishima, Yokohama (JP); Naoyuki Nagafuchi, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 107 days.

(21) Appl. No.: 14/964,185

(22) Filed: Dec. 9, 2015

(65) Prior Publication Data

US 2016/0169210 A1    Jun. 16, 2016

(30) Foreign Application Priority Data

Dec. 11, 2014 (JP) ................. 2014-251157

(51) Int. Cl.
*B60K 16/00* (2006.01)
*F03G 6/06* (2006.01)

(52) U.S. Cl.
CPC ............ *F03G 6/064* (2013.01); *Y02E 10/465* (2013.01)

(58) Field of Classification Search
CPC ................ F03G 6/064; Y02E 10/465
(Continued)

(56) References Cited

U.S. PATENT DOCUMENTS 6,957,536 B2    10/2005  Litwin et al.
2004/0244376 A1  12/2004  Litwin et al.
(Continued)

FOREIGN PATENT DOCUMENTS

CN    102015072 A    4/2011
CN    102182652 A    9/2011
(Continued)

OTHER PUBLICATIONS

Chinese Office Action issued in counterpart Chinese Application No. 201510904143.X dated Dec. 28, 2016 (twelve (12) pages).
"Crescent Dunes", Solar Rserve, LLC., 2015, http://www.solar-reserve.com/en/global-projects/csp/crescent-dunes, (Four (4) pages).
(Continued)

*Primary Examiner* — Jason Shanske
(74) *Attorney, Agent, or Firm* — Crowell & Moring LLP

(57) ABSTRACT

The object is to simplify systems in a solar thermal power generation plant and thereby provide a solar thermal power generation system achieving reduction in the construction cost and the power generation cost. The solar thermal power generation system comprises: a solar heat collection device which collects solar heat and thereby heats up molten salt as a primary heat medium; a solar heat accumulation/radiation device including a low-temperature tank which stores molten salt to be supplied to the solar heat collection device, a high-temperature tank which stores high-temperature molten salt heated by the solar heat collection device, and a secondary heat medium heater which heats up a secondary heat medium by using the high-temperature molten salt supplied from the high-temperature tank as a heating medium; and a compressor/high-temperature turbine power generation device including a compressor which generates compressed air as the secondary heat medium by compressing air taken in from the atmosphere to a prescribed pressure and a high-temperature air turbine which drives a generator by taking in the compressed air heated by the secondary heat medium heater.

6 Claims, 7 Drawing Sheets

(58) Field of Classification Search
USPC .......................................................... 60/641.8
See application file for complete search history.

(56) References Cited

U.S. PATENT DOCUMENTS

| | | | | |
|---|---|---|---|---|
| 2008/0000231 | A1* | 1/2008 | Litwin | F03G 6/06 60/641.11 |
| 2008/0141672 | A1* | 6/2008 | Shah | B01D 53/75 60/648 |
| 2011/0061361 | A1 | 3/2011 | Shah et al. | |
| 2011/0127773 | A1 | 6/2011 | Freund et al. | |
| 2011/0192168 | A1 | 8/2011 | Joshi et al. | |
| 2011/0259007 | A1* | 10/2011 | Aoyama | F02C 1/05 60/641.14 |
| 2011/0283700 | A1 | 11/2011 | Zohar et al. | |
| 2013/0033111 | A1* | 2/2013 | Kawamoto | G05F 1/67 307/66 |
| 2013/0206382 | A1* | 8/2013 | Ichishi | B60N 2/5628 165/203 |
| 2014/0138959 | A1 | 5/2014 | Zohar et al. | |

FOREIGN PATENT DOCUMENTS

| | | | |
|---|---|---|---|
| CN | 102326261 | A | 1/2012 |
| EP | 1 873 397 | A2 | 1/2008 |
| GB | 2 449 181 | A | 11/2008 |
| JP | 2-45622 | A | 2/1990 |
| JP | 11-280638 | A | 10/1999 |
| JP | 2008-14627 | A | 1/2008 |
| JP | 2008-95686 | A | 4/2008 |
| JP | 2010-275997 | A | 12/2010 |
| JP | 2011-117447 | A | 6/2011 |
| JP | 2013-147996 | A | 8/2013 |
| JP | 2014-92086 | A | 5/2014 |
| JP | 5550787 | B2 | 7/2014 |

OTHER PUBLICATIONS

Extended European Search Report issued in counterpart European Application No. 15198438.2 dated Apr. 15, 2016 (eight (8) pages).
Japanese Office Action issued in counterpart Japanese Application No. 2014-251157 dated Jun. 27, 2017 with English-language translation (ten (10) pages).

* cited by examiner

US 9,957,954 B2

SOLAR THERMAL POWER GENERATION SYSTEM

BACKGROUND OF THE INVENTION

1. Field of the Invention

The present invention relates to a solar thermal power generation system.

2. Description of the Related Art

As an example of a solar thermal power generation plant capable of efficiently accumulating solar heat, there exists a solar thermal power generation plant comprising a solar heat collection device which generates superheated steam by using water/steam (water vapor) as the primary heat medium, a solar heat accumulation/radiation device which uses molten salt or oil as the solar heat accumulation/radiation heat medium, and steam turbine power generation equipment which uses steam (water vapor) as the secondary heat medium (see JP-2014-92086-A, for example).

There also exists a solar thermal power generation plant comprising a high-temperature molten salt tank which stores high-temperature molten salt supplied from a heat collector by using molten salt as the primary heat medium and the heat accumulation/radiation heat medium while using steam (water vapor) as the secondary heat medium and a low-temperature molten salt tank which stores the molten salt after being used for heating the secondary heat medium driving the steam turbine (see "Crescent Dunes" [online]. Solar Reserve, LLC. [retrieved 20, May 2015]. Retrieved from the Internet: <URL: http://www.solarreserve.com/en/global-projects/csp/crescent-dunes> (hereinafter referred to as a "Non-patent literature 1"), for example).

As shown in FIG. 7 (conceptual diagram showing the configuration of a conventional solar thermal power generation plant), this solar thermal power generation plant comprises heliostats 200 as sun tracking mirrors configured to change their positions depending on the direction of the sun in order to efficiently collect the heat of direct sunlight (heat radiation from the sun) in the heat collector, a primary system A as a solar heat collection/accumulation system in which molten salt is circulated as the primary heat medium, and a secondary system B which carries out the electric power generation by driving the steam turbine with the steam (water vapor) as the secondary heat medium.

The primary system A includes a low-temperature molten salt tank 201, a first molten salt pump 202, a heat collector 203, a high-temperature molten salt tank 204, a second molten salt pump 205, a superheater 206, a reheater 207, an evaporator 208, and a feed-water preheater 209. The low-temperature molten salt tank 201 stores the low-temperature molten salt. The first molten salt pump 202 draws out the low-temperature molten salt from the low-temperature molten salt tank 201 and sends out the low-temperature molten salt. The heat collector 203 collects the heat of direct sunlight from the heliostats 200 and thereby heats up the molten salt sent out from the first molten salt pump 202. The high-temperature molten salt tank 204 stores the high-temperature molten salt heated by the heat collector 203. The second molten salt pump 205 draws out the high-temperature molten salt from the high-temperature molten salt tank 204 and sends out the high-temperature molten salt. The superheater 206, reheater 207, evaporator 208 and feed-water preheater 209 are supplied with the high-temperature molten salt from the second molten salt pump 205 and thereby heat up feed-water and the steam (water vapor) as the secondary heat medium. The molten salt after being cooled down due to the heating of the feed-water in the feed-water preheater 209 is stored in the low-temperature molten salt tank 201.

The secondary system B includes a high-pressure turbine 301, an intermediate/low-pressure turbine 302, an air-cooled steam condenser 303, a condensation tank 304, a feed-water pump 305, and a generator 306. The high-pressure turbine 301 is driven by superheated steam supplied from the superheater 206. The intermediate/low-pressure turbine 302 is driven by reheated steam supplied from the reheater 207. The air-cooled steam condenser 303 condenses the secondary heat medium after finishing the work in the intermediate/low-pressure turbine 302. The condensation tank 304 stores the condensed water. The feed-water pump 305 sends out the feed-water from the condensation tank 304 to the feed-water preheater 209. The generator 306 is driven by the high-pressure turbine 301 and the intermediate/low-pressure turbine 302 and carries out the electric power generation.

In this solar thermal power generation plant, during the nighttime, it is possible to heat up the secondary heat medium by supplying the high-temperature molten salt stored in the high-temperature molten salt tank 204 to the superheater 206, the reheater 207, the evaporator 208 and the feed-water preheater 209 and recovering the molten salt into the low-temperature molten salt tank 201, without supplying the molten salt from the low-temperature molten salt tank 201 to the heat collector 203 and the high-temperature molten salt tank 204. Therefore, the power generation can be carried out during the nighttime by driving the high-pressure turbine 301 and the intermediate/low-pressure turbine 302 with steam generated by heating up the secondary heat medium.

SUMMARY OF THE INVENTION

The solar thermal power generation plant described in JP-2014-92086-A comprises a main steam selector valve 6, a heat-accumulation-operation steam heat exchanger inlet valve 41 and a heat-radiation-operation high-pressure steam turbine inlet piping confluence valve 107, and the switching control of these three valves is regulated depending on the operation mode (solar heat accumulation operation mode or solar heat radiation operation mode). Thus, there is apprehension about complication of the switching system employing the three valves and complication of the operation such as the switching control.

Further, the steam (water vapor) as the primary heat medium for transmitting heat to a heat storage material undergoes phase change phenomena from gas to liquid (from superheated steam and saturated steam to saturated water) due to temperature variations. Thus, installation of four types of heat exchangers (steam heat exchanger 33, saturated steam condenser 34, saturated water heat exchanger 35, saturated water evaporator 38) becomes necessary and the heat accumulation/radiation system is necessitated to be complicated, leading to a rise in the construction cost of the solar thermal power generation plant.

The solar thermal power generation plant described in the Non-patent literature 1 is also a system performing the power generation by driving a steam turbine by using steam (water vapor) as the secondary heat medium. Thus, also in this case, installation of multiple heat exchangers (feed-water preheater, evaporator, superheater, reheater) compatible with the phase change phenomena becomes necessary, the system is complicated, and the construction cost rises.

The object of the present invention, which has been made in consideration of the above-described situation, is to simplify systems in the solar thermal power generation plant and thereby provide a solar thermal power generation system achieving reduction in the construction cost and the power generation cost.

To achieve the above object, an aspect of the present invention provides a solar thermal power generation system comprising: a solar heat collection device which collects solar heat and thereby heats up molten salt as a primary heat medium; a solar heat accumulation/radiation device including a low-temperature tank which stores molten salt to be supplied to the solar heat collection device, a high-temperature tank which stores high-temperature molten salt heated by the solar heat collection device, and a secondary heat medium heater which heats up a secondary heat medium by using the high-temperature molten salt supplied from the high-temperature tank as a heating medium; and a compressor/high-temperature turbine power generation device including a compressor which generates compressed air as the secondary heat medium by compressing air taken in from the atmosphere to a prescribed pressure and a high-temperature air turbine which drives a generator by taking in the compressed air heated by the secondary heat medium heater.

According to the present invention, systems in the solar thermal power generation plant can be simplified and a solar thermal power generation system achieving reduction in the construction cost and the power generation cost can be provided.

DESCRIPTION OF THE PREFERRED EMBODIMENTS

Figure 1:
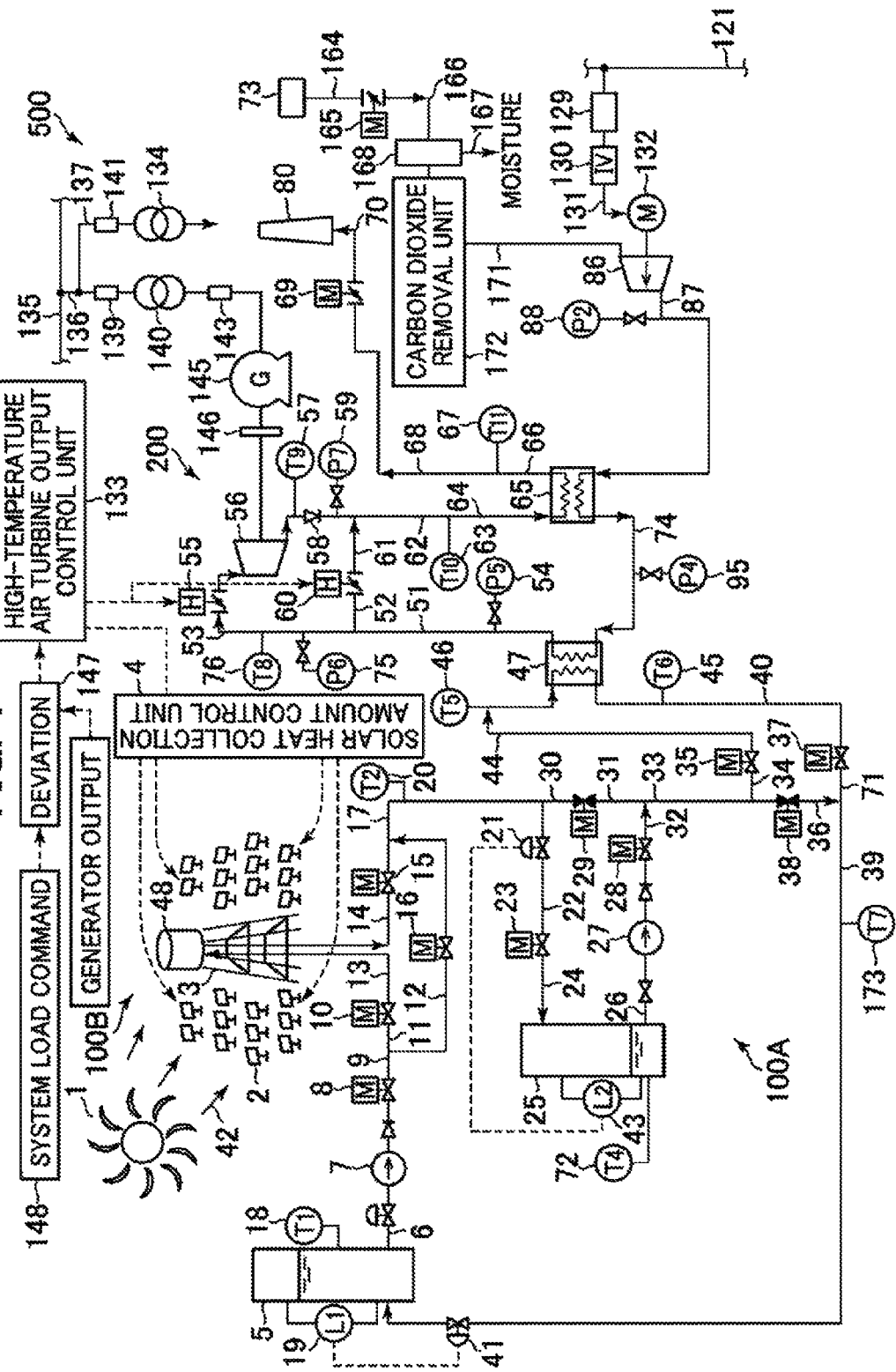
FIG. 1 is a conceptual diagram showing the configuration of a first embodiment of a solar thermal power generation system according to the present invention.

An embodiment of a solar thermal power generation system according to the present invention will be described below.

The embodiment of the solar thermal power generation system according to the present invention comprises a primary system which collects solar heat and performs heat accumulation and heat radiation by using molten salt as a primary system heat medium and a secondary system which performs the electric power generation by driving a high-temperature air turbine by using compressed air (air taken in from the surrounding atmosphere and compressed by one air compressor) as a secondary system heat medium. In the secondary system, the compressed air is heated up by a secondary heat medium heater, thereby turns into high-temperature air, and drives the high-temperature air turbine. After driving the high-temperature air turbine, the high-temperature air heats up air at the outlet of the compressor and is thereafter discharged to the atmosphere.

The high-temperature air turbine is designed not assuming high-temperature air (e.g. around 850° C.) at the turbine inlet, but assuming a lower temperature range of approximately 400° C.-600° C. This makes it possible to provide a high-temperature air turbine using a standard type of carbon alloy steel while reducing the amount of use of expensive metallic materials such as nickel. As a result, cost reduction of the high-temperature air turbine is achieved and solar thermal power generation systems that are environment-friendly and economical can be constructed.

Concretely, not steam (water vapor) but molten salt is used as the primary heat medium as the primary system heat medium for collecting solar heat and performing the heat accumulation and heat radiation, and this high-temperature heat medium is utilized as a high-temperature heat source. On the other hand, not a steam turbine but the high-temperature air turbine is used for the secondary system (power generation system). Specifically, high-pressure and high-temperature air at a temperature around 600° C. and a relatively low pressure around 6 bar (absolute pressure)-10 bar (absolute pressure) is generated by using an air compressor, and the power generation is conducted by driving the high-temperature air turbine and the generator by using the air as the secondary heat medium.

As the heat storage material as the high-temperature heat medium necessary for the heat accumulation operation and the heat radiation operation, low-priced molten salt enduring high-temperature specifications up to approximately 600° C. (e.g., molten salt as a mixture of 60% sodium nitrate and 40% potassium nitrate) can be used. As for the low-temperature heat medium, air in the atmosphere is utilized as the secondary heat medium. The secondary heat medium is compressed by using one or multiple air compressors.

The secondary heat medium heater is provided as the heat exchanger for conducting the heat exchange between the primary heat medium and the secondary heat medium. With this configuration, high-temperature air heated by the solar heat is generated and supplied to the high-temperature air turbine. The high-temperature air turbine carries out the power generation by driving the generator directly connected thereto. Power remaining after subtraction of in-house power consumption (power consumed by the air compressor(s), etc.) is supplied to the system (electric system) as the transmission electric power.

A device of not the trough type but the tower type advantageous for acquiring high-temperature air is employed as a solar heat collection device constituting the embodiment of the solar thermal power generation system according to the present invention. In this embodiment, during the daytime, the power generation is carried out while also conducting an operation of storing the primary heat medium in a tank of the two-tank type in preparation for the power generation in the nighttime. In the nighttime, an operation of performing the power generation by sending out the primary heat medium from the tank and radiating (releasing) heat is conducted.

The details will be described below with reference to figures.

First Embodiment

FIG. 1 is a conceptual diagram showing the configuration of a first embodiment of the solar thermal power generation system according to the present invention.

In FIG. 1, the solar thermal power generation system comprises a solar heat accumulation/radiation device 100A constituting the primary system, a solar heat collection device 100B also constituting the primary system, and a compressor/high-temperature turbine power generation device 200 constituting the secondary system.

The solar heat accumulation/radiation device 100A is mainly composed of a primary low-temperature heat medium tank 5, a primary low-temperature heat medium pump 7, a primary high-temperature heat medium tank 25, a primary high-temperature heat medium pump 27, and a secondary heat medium heater 47. The primary low-temperature heat medium tank 5 stores a low-temperature primary heat medium. The primary low-temperature heat medium pump 7 sends out the primary heat medium from the primary low-temperature heat medium tank 5 to the solar heat collection device 100B. The primary high-temperature heat medium tank 25 stores the high-temperature primary heat medium supplied from the solar heat collection device 100B. The primary high-temperature heat medium pump 27 sends out the primary heat medium from the primary high-temperature heat medium tank 25 to the secondary heat medium heater 47 or the primary low-temperature heat medium tank 5. The secondary heat medium heater 47 transfers the heat energy of the high-temperature primary heat medium to the compressed air (secondary heat medium).

The solar heat collection device 100B is mainly composed of a heat collector 48, a plurality of heliostats 2, and a solar heat collection amount control unit 4. The heat collector 48 is mounted at the top of a tower 3. The heliostats 2 raise the temperature of the primary heat medium by reflecting direct normal irradiation 42 (radiation from the sun 1) with reflecting mirrors and collecting the direct normal irradiation 42 into the heat collector 48 as direct sunlight reflected light. The solar heat collection amount control unit 4 controls the sunlight reflection angle of each heliostat 2 in order to collect a necessary amount of solar heat energy.

The compressor/high-temperature turbine power generation device 200 mainly includes a first compressor 86 which draws in air from the atmosphere and compresses the air, a regenerator 65 which heats up the compressed air from the first compressor 86, a high-temperature air turbine 56 which is driven by high-temperature air further heated by the secondary heat medium heater 47 after being heated by the regenerator 65, a generator 145 which is driven by the high-temperature air turbine 56 and carries out the power generation, and an in-house electric system 500. Exhaust air discharged from the high-temperature air turbine 56 is supplied to the regenerator 65, used for heating the compressed air from the first compressor 86, and thereafter discharged from a discharge tower 80. Rotary shafts of the high-temperature air turbine 56 and the generator 145 are coupled/detached to/from each other via a shaft coupler 146. A clutch or a torque converter is used as the shaft coupler 146.

A first compressor inlet air pipe 171 is connected to the air inlet of the first compressor 86. The first compressor inlet air pipe 171 is equipped with an air drier 168 and a carbon dioxide removal unit 172. One end of an air inlet pipe 164 is connected to a point upstream of the first compressor inlet air pipe 171. The other end of the air inlet pipe 164 is equipped with a first intake air inlet filter 73.

The in-house electric system 500 includes a generator outlet main circuit whose one end is connected to the output end of the generator 145, a generator outlet breaker 143 which is connected to the other end of the generator outlet main circuit, a main transformer 140 which boosts the output voltage of the generator 145 to a system voltage, and a main circuit breaker 139 which is arranged on the high voltage side of the main transformer 140 to connect and interrupt the line between the generator 145 and an external electric system 135.

The in-house electric system 500 also includes an in-house electric power breaker 141 which connects and interrupts the line between the in-house electric power and the external electric system 135, an in-house transformer 134 which steps down the system voltage to the voltage of the in-house power supply, an in-house electric system 121 which is connected to the low pressure side of the in-house transformer 134, and a first compressor breaker 129 which connects and interrupts the line between (the electric power from) the in-house electric system 121 and a first compressor motor inverter unit 130.

Next, the configuration of the solar heat accumulation/radiation device 100A, the solar heat collection device 100B and the compressor/high-temperature turbine power generation device 200 will be described below while explaining the flow of each heat medium in the solar thermal power generation system.

As shown in FIG. 1, in the solar heat accumulation/radiation device 100A and the solar heat collection device 100B, low-temperature molten salt as the primary heat medium stored in the primary low-temperature heat medium tank 5 is drawn out via a primary low-temperature heat medium pump inlet pipe 6 and pressurized by the primary low-temperature heat medium pump 7. The pressurized low-temperature molten salt flows through a primary low-temperature heat medium pump outlet valve 8, a primary low-temperature heat medium pump outlet pipe 9, a tower inlet valve 10 and a tower inlet heat medium pipe 13 and is supplied to the heat collector 48.

In the heat collector 48, high-temperature heat energy obtained by collecting the direct normal irradiation 42 (radiation from the sun 1) by use of a great number of heliostats (sunlight reflecting mirrors) 2 reflecting the sunlight is used for the heating of the low-temperature molten salt.

The heated low-temperature molten salt turns into high-temperature molten salt, flows through a tower outlet heat medium pipe 14, a tower outlet valve 15 and a tower outlet pipe 17, and is supplied to a primary high-temperature heat medium tank liquid level control valve 21 which controls the liquid level of the primary high-temperature heat medium tank (high-temperature tank) 25. The tower outlet pipe 17 is equipped with a temperature sensor 20 for detecting the temperature of the high-temperature molten salt in the pipe. The primary high-temperature heat medium tank (high-temperature tank) 25 is equipped with a liquid level sensor 43 for detecting the liquid level of the high-temperature molten salt and a temperature sensor 72 for detecting the temperature of the high-temperature molten salt. A control signal corresponding to the liquid level of the high-temperature molten salt detected by the liquid level sensor 43 is sent to the primary high-temperature heat medium tank liquid level control valve 21, by which the liquid level of the primary high-temperature heat medium tank (high-temperature tank) 25 is controlled.

After passing through the primary high-temperature heat medium tank liquid level control valve 21, the high-temperature molten salt is sent to the primary high-temperature heat medium tank (high-temperature tank) 25 via a primary high-temperature heat medium tank inlet pipe 22, a primary high-temperature heat medium tank inlet valve 23 and a primary high-temperature heat medium tank inlet valve outlet pipe 24.

A tower bypass pipe 12 and a tower bypass valve 16 are arranged to bypass the tower 3. One end of the tower bypass pipe 12 is connected to the primary low-temperature heat medium pump outlet pipe 9, while the other end is connected to the tower outlet pipe 17. The tower bypass valve 16 connects and interrupts the tower bypass pipe 12. The tower bypass valve 16 is a bypass valve for directly supplying the low-temperature molten salt to the primary high-temperature heat medium tank (high-temperature tank) 25 when some abnormality occurred to the tower 3's side and the low-temperature molten salt cannot be supplied to the heat collector 48. Further, when sufficient solar heat cannot be collected (e.g., early morning), at the startup of the system, it is possible to perform an operation of directly sending the low-temperature molten salt to the primary high-temperature heat medium tank (high-temperature tank) 25 by using the bypass system as needed.

Subsequently, the high-temperature molten salt stored in the primary high-temperature heat medium tank 25 is drawn out via a primary high-temperature heat medium tank outlet pipe 26 and pressurized by the primary high-temperature heat medium pump 27. The pressurized high-temperature molten salt flows through a primary high-temperature heat medium pump outlet valve 28, a primary high-temperature heat medium pump outlet valve outlet pipe 32, a primary high-temperature heat medium tank outlet header pipe 33, a secondary heat medium heater inlet primary heat medium pipe 34, a secondary heat medium heater inlet primary heat medium valve 35 and a secondary heat medium heater primary heat medium inlet pipe 44, and is supplied to the secondary heat medium heater 47. The secondary heat medium heater primary heat medium inlet pipe 44 is equipped with a temperature sensor 46 for detecting the temperature of the high-temperature molten salt in the pipe.

The flow rate of the high-temperature molten salt drawn out by the primary high-temperature heat medium pump 27 is approximately half of the flow rate of the low-temperature molten salt sent out (supplied) from the primary low-temperature heat medium pump 7. The remainder of the high-temperature molten salt corresponding to the flow rate difference is stored in the primary high-temperature heat medium tank (high-temperature tank) 25. This enables the solar heat accumulation operation.

A primary high-temperature heat medium tank bypass valve inlet pipe 30, a primary high-temperature heat medium tank bypass valve 29 and a primary high-temperature heat medium tank bypass valve outlet pipe 31 are arranged to bypass the primary high-temperature heat medium tank (high-temperature tank) 25. One end of the primary high-temperature heat medium tank bypass valve inlet pipe 30 is connected to the downstream side of the tower outlet pipe 17, while the other end is connected to the inlet side of the primary high-temperature heat medium tank bypass valve 29. One end of the primary high-temperature heat medium tank bypass valve outlet pipe 31 is connected to the outlet side of the primary high-temperature heat medium tank bypass valve 29, while the other end is connected to the downstream side of the primary high-temperature heat medium pump outlet valve outlet pipe 32. The primary high-temperature heat medium tank bypass valve 29 is a bypass valve for bypassing the primary high-temperature heat medium tank (high-temperature tank) 25 when an abnormality occurred to the primary high-temperature heat medium tank (high-temperature tank) 25's side and the high-temperature molten salt cannot be supplied to the primary high-temperature heat medium tank (high-temperature tank) 25.

The molten salt that heated the secondary heat medium in the secondary heat medium heater 47 turns into low-temperature molten salt. The low-temperature molten salt flows through a secondary heat medium heater primary heat medium outlet pipe 40, a secondary heat medium heater primary heat medium outlet valve 37, a secondary heat medium heater primary heat medium outlet valve outlet pipe 71, a primary low-temperature heat medium tank return primary heat medium pipe 39, and a primary low-temperature heat medium tank liquid level control valve 41 which controls the liquid level of the primary low-temperature heat medium tank (low-temperature tank) 5. Then, the low-temperature molten salt returns to the primary low-temperature heat medium tank (low-temperature tank) 5 and stored therein.

The secondary heat medium heater primary heat medium outlet pipe 40 is equipped with a temperature sensor 45 for detecting the temperature of the low-temperature molten salt in the pipe. The primary low-temperature heat medium tank return primary heat medium pipe 39 is also equipped with a temperature sensor 173 for detecting the temperature of the low-temperature molten salt in the pipe. The primary low-temperature heat medium tank (low-temperature tank) 5 is equipped with a liquid level sensor 19 for detecting the liquid level of the low-temperature molten salt and a temperature sensor 18 for detecting the temperature of the low-temperature molten salt. A control signal corresponding to the liquid level of the low-temperature molten salt detected by the liquid level sensor 19 is sent to the primary low-temperature heat medium tank liquid level control valve 41, by which the liquid level of the primary low-temperature heat medium tank (low-temperature tank) 5 is controlled.

A secondary heat medium heater bypass valve outlet primary heat medium pipe 36 and a secondary heat medium heater primary heat medium bypass valve 38 are arranged to bypass the secondary heat medium heater 47. One end of the secondary heat medium heater bypass valve outlet primary heat medium pipe 36 is connected to the primary high-temperature heat medium tank outlet header pipe 33, while the other end is connected to the secondary heat medium heater primary heat medium outlet valve outlet pipe 71. The secondary heat medium heater primary heat medium bypass valve 38 connects and interrupts the secondary heat medium heater bypass valve outlet primary heat medium pipe 36. The secondary heat medium heater primary heat medium bypass valve 38 is a bypass valve for bypassing the secondary heat medium heater 47 when an abnormality occurred to the secondary heat medium heater 47 and the high-temperature molten salt cannot be supplied to the secondary heat medium heater 47.

Next, control instrumentation systems of the solar heat accumulation/radiation device 100A and the solar heat collection device 100B will be described below.

The solar heat collection amount control unit 4 constituting the solar heat collection device 100B takes in a command signal sent from a high-temperature air turbine output control unit 133 (explained later), a temperature signal representing the temperature of the low-temperature molten salt in the primary low-temperature heat medium tank 5 detected by the temperature sensor 18, and a temperature signal representing the temperature of the high-temperature molten salt in the primary high-temperature heat medium tank 25 detected by the temperature sensor 72. Based on these signals, the solar heat collection amount control unit 4 outputs commands for controlling the sunlight reflection angle to pertinent heliostats 2 (selected from all the heliostats 2) in order to efficiently collect the sunlight into the heat collector 48 and thereby collect a necessary amount of solar heat energy.

The solar heat collection amount control unit 4 also takes in a temperature signal representing the temperature of the high-temperature molten salt flowing in the tower outlet pipe 17 detected by the temperature sensor 20 and checks whether or not the heat collector 48 is operating normally and the high-temperature molten salt has been heated by the solar heat energy up to a planned temperature.

The solar heat collection amount control unit 4 also takes in a temperature signal representing the temperature of the high-temperature molten salt flowing in the secondary heat medium heater primary heat medium inlet pipe 44 detected by the temperature sensor 46, a temperature signal representing the temperature of the low-temperature molten salt flowing in the secondary heat medium heater primary heat medium outlet pipe 40 detected by the temperature sensor 45, and a temperature signal representing the temperature of the low-temperature molten salt flowing in the primary low-temperature heat medium tank return primary heat medium pipe 39 detected by the temperature sensor 173. By using these signals, the solar heat collection amount control unit 4 monitors whether or not the solar heat energy is being consistently transmitted to the secondary heat medium.

The solar heat collection amount control unit 4 also takes in a temperature signal representing the temperature of the low-temperature molten salt in the primary low-temperature heat medium tank 5 detected by the temperature sensor 18 and performs monitoring control so that the temperature does not fall below a lower limit temperature (approximately 260° C.) of the low-temperature molten salt. Specifically, the primary low-temperature heat medium tank 5 is provided with a heater and the low-temperature molten salt in the tank is heated by energizing the heater when the temperature of the low-temperature molten salt approaches the lower limit temperature, for example. The lower limit temperature (260° C. in this explanation) varies depending on the type of the molten salt.

Next, the configuration of the compressor/high-temperature turbine power generation device 200 will be described below while explaining the flow of the heat media in the compressor/high-temperature turbine power generation device 200.

As shown in FIG. 1, in the compressor/high-temperature turbine power generation device 200, air to be used as the secondary heat medium is taken in through the first intake air inlet filter 73 and flows into the air drier 168 via the air inlet pipe 164, an air drier inlet valve 165 and an air drier inlet pipe 166. The air drier 168 removes moisture (water) from the intake air. The removed moisture (water) is discharged to the outside of the system via an air drier moisture discharge pipe 167.

The clean air from which moisture has been removed by the air drier 168 passes through the carbon dioxide removal unit 172, flows through the first compressor inlet air pipe 171, and is sucked into the first compressor 86. The carbon dioxide removal unit 172 is a device for removing carbon dioxide gas contained in a small amount in the intake air. The carbon dioxide removal unit 172 is a device used for the purpose of preventing corrosion of ferrous metals of devices on the downstream side by carbonic acid deriving from the carbon dioxide gas, and thus is not a device absolutely necessarily in the present invention.

High-pressure air obtained by the compression by the first compressor 86 flows through a first compressor outlet pipe 87 and then flows into the regenerator 65. The first compressor outlet pipe 87 is equipped with a pressure sensor 88 for detecting outlet air pressure of the first compressor 86. The performance of the first compressor 86 is monitored by using the pressure sensor 88.

The high-pressure air that flowed into the regenerator 65 is heated up by means of heat exchange using the exhaust air discharged from the high-temperature air turbine 56 as the heating medium. The high-pressure air heated by the regenerator 65 is sent to the secondary heat medium heater 47 via a secondary heat medium heater air inlet pipe 74. The secondary heat medium heater air inlet pipe 74 is equipped with a pressure sensor 95 for detecting air inlet pressure of the secondary heat medium heater 47.

The high-pressure air that flowed into the secondary heat medium heater 47 is heated up by means of heat exchange using the high-temperature molten salt (primary heat medium) as the heating medium. The high-pressure and high-temperature air obtained by the heating by the secondary heat medium heater 47 flows through a secondary heat medium outlet pipe 51 and then branches into a high-temperature air turbine inlet butterfly valve inlet pipe 53 and a high-temperature air turbine bypass butterfly valve inlet pipe 52. The secondary heat medium outlet pipe 51 is equipped with a pressure sensor 54 for detecting air outlet pressure of the secondary heat medium heater 47. The pressure sensor 54 is used to monitor whether or not the pressure on the air's side of the secondary heat medium heater 47 is in agreement with a planned value. The high-temperature air turbine inlet butterfly valve inlet pipe 53 is equipped with a temperature sensor 76 for detecting the air temperature at the inlet of the high-temperature air turbine 56 and a pressure sensor 75 for detecting the air pressure at the inlet of the high-temperature air turbine 56.

The high-temperature air turbine inlet butterfly valve inlet pipe 53 is connected to a high-temperature air turbine inlet butterfly valve 55, while the high-temperature air turbine bypass butterfly valve inlet pipe 52 is connected to a high-temperature air turbine bypass butterfly valve 60. The open angles of these butterfly valves 55 and 60 are controlled by commands sent from the high-temperature air turbine output control unit 133 (explained later). Specifically, in normal load operation, the output power of the high-temperature air turbine 56 is controlled by regulating the flow rate and the pressure of the high-temperature air flowing into the high-temperature air turbine 56 by the open angle control of the high-temperature air turbine inlet butterfly valve 55. In contrast, when the high-pressure and high-temperature air cannot be fed into the high-temperature air turbine 56 (e.g., at the startup of the high-temperature air turbine 56 or when an abnormality has occurred), the high-temperature air turbine bypass butterfly valve 60 is opened and the high-pressure and high-temperature air is released into a high-temperature air turbine exhaust header pipe 62 via a high-temperature air turbine bypass butterfly valve outlet pipe 61.

The exhaust air from the high-temperature air turbine 56 is discharged through the outlet of the high-temperature air turbine 56, flows through a high-temperature air turbine exhaust check valve 58, the high-temperature air turbine exhaust header pipe 62 and a high-temperature secondary heat medium regenerator inlet pipe 64, and then flows into the regenerator 65 as a high-temperature secondary heat medium. A temperature sensor 57 for detecting the air temperature at the outlet of the high-temperature air turbine 56 is arranged on the upstream side of the high-temperature air turbine exhaust check valve 58. On the downstream side of the high-temperature air turbine exhaust check valve 58, a pressure sensor 59 for detecting the air pressure at the outlet of the high-temperature air turbine 56 is arranged. The high-temperature air turbine exhaust header pipe 62 is equipped with a temperature sensor 63 for detecting inlet temperature of the high-temperature secondary heat medium flowing into the regenerator 65.

The exhaust air flowing into the regenerator 65 heats up air at the outlet of the first compressor 86 and then flows downstream through a high-temperature secondary heat medium regenerator outlet pipe 66 and a regenerator outlet secondary heat medium pipe 68. Thereafter, the exhaust air is led to the secondary heat medium discharge tower 80 via a regenerator outlet secondary heat medium exhaust butterfly valve 69 and a secondary heat medium discharge tower inlet pipe 70, and is discharged from the tower to the atmosphere. The high-temperature secondary heat medium regenerator outlet pipe 66 is equipped with a temperature sensor 67 for detecting the exhaust air temperature.

As explained above, the high-pressure and high-temperature air whose pressure and flow rate have been controlled by the high-temperature air turbine inlet butterfly valve 55 is introduced into the high-temperature air turbine 56 and drives the high-temperature air turbine 56 and the generator 145 coupled thereto. Electric power generated by the generator 145 is supplied (paralleled in) to the external electric system 135 via the generator outlet breaker 143, the main transformer 140, the main circuit breaker 139 and an internal electric power transmission circuit 136. An in-house electric power transmission circuit 137 is connected to the internal electric power transmission circuit 136. The in-house electric power passes through the in-house electric power breaker 141, is stepped down by the in-house transformer 134 to an in-house voltage, and is supplied to the in-house electric system 121.

In the in-house electric system 121, a first compressor motor 132 (electric motor, first electric motor) for driving the first compressor 86 is supplied with frequency-converted electric power from the first compressor motor inverter unit 130 via a first compressor motor electric circuit 131. The first compressor motor inverter unit 130 is supplied with the in-house electric power from the in-house electric system 121 via the first compressor breaker 129.

With this configuration, revolution speed control of the first compressor motor 132 becomes possible, and revolution speed control operation becomes possible from the startup of the first compressor 86 to the partial load operation, and further to the full load operation (rated load operation). Consequently, the power consumption of the first compressor 86 can be reduced significantly compared to the commonly used compressor outlet valve throttle control method.

Next, the control instrumentation system of the compressor/high-temperature turbine power generation device 200 will be described below.

The high-temperature air turbine output control unit 133 constituting the compressor/high-temperature turbine power generation device 200 receives a deviation signal from a deviation calculation unit 147 which calculates a deviation by comparing the power generation output of the generator 145 with a system load command 148 from a central load-dispatching office. The high-temperature air turbine output control unit 133 loads the deviation signal, a high-temperature air turbine inlet air temperature signal from the temperature sensor 76, a high-temperature air turbine inlet air pressure signal from the pressure sensor 75, a high-temperature air turbine outlet air temperature signal from the temperature sensor 57, and a high-temperature air turbine outlet air pressure signal from the pressure sensor 59, and calculates the electric output of the high-temperature air turbine 56 and the flow rate and the pressure of the high-pressure and high-temperature air to be introduced to the high-temperature air turbine 56. The output control of the high-temperature air turbine 56 is conducted by outputting valve open angle command signals to the high-temperature air turbine inlet butterfly valve 55 and the high-temperature air turbine bypass butterfly valve 60 so that the flow rate and the pressure of the high-pressure and high-temperature air become equal to the calculated flow rate and pressure. The high-temperature air turbine inlet butterfly valve 55 and the high-temperature air turbine bypass butterfly valve 60 are used also when the plant is started up or stopped. Specifically, at the time of startup, in order to synchronize the revolution speed of the high-temperature air turbine 56 to the frequency of the system, the revolution speed of the high-temperature air turbine 56 is controlled by regulating the amount of high-temperature air introduced into the high-temperature air turbine 56 (for accelerating the turbine) and the amount of air bypassing the high-temperature air turbine 56, by which the generator 145 (high-temperature air turbine generator) connected to the turbine is accelerated, synchronized to the system, and incorporated into (paralleled in) the system. At the time of stoppage, the generator 145 is divided (paralleled off) from the system by throttling the amount of high-temperature air flowing into the high-temperature air turbine 56 to the no-load level. At the same time, the high-temperature air turbine inlet butterfly valve 55 is totally closed and the high-temperature air turbine bypass butterfly valve 60 is opened, by which the high-temperature air turbine 56 is stopped while having the high-temperature air bypass the high-temperature air turbine 56 and escape to the atmosphere.

The high-temperature air turbine output control unit 133 outputs a signal representing the calculated electric output of the high-temperature air turbine 56 to the solar heat collection amount control unit 4. According to the input signal representing the electric output of the high-temperature air turbine 56, the solar heat collection amount control unit 4 outputs the commands for controlling the sunlight reflection angle to pertinent heliostats 2 (selected from all the heliostats 2) in order to collect a necessary amount of solar heat energy.

The high-temperature air turbine output control unit 133 calculates the temperature drop from the aforementioned high-temperature air turbine inlet air temperature signal and high-temperature air turbine outlet air temperature signal, while also calculating the pressure drop from the aforementioned high-temperature air turbine inlet air pressure signal and high-temperature air turbine outlet air pressure signal.

By using these values, the power (rotary power) produced in the high-temperature air turbine 56 is calculated.

Further, the high-temperature air turbine output control unit 133 takes in a signal representing the regenerator inlet temperature of the high-temperature secondary heat medium detected by the temperature sensor 63 and a signal representing the regenerator outlet temperature of the high-temperature secondary heat medium detected by the temperature sensor 67 and monitors whether or not the heat energy of the high-temperature secondary heat medium is being consistently used for the heating of the outlet air of the first compressor 86.

Figure 2:
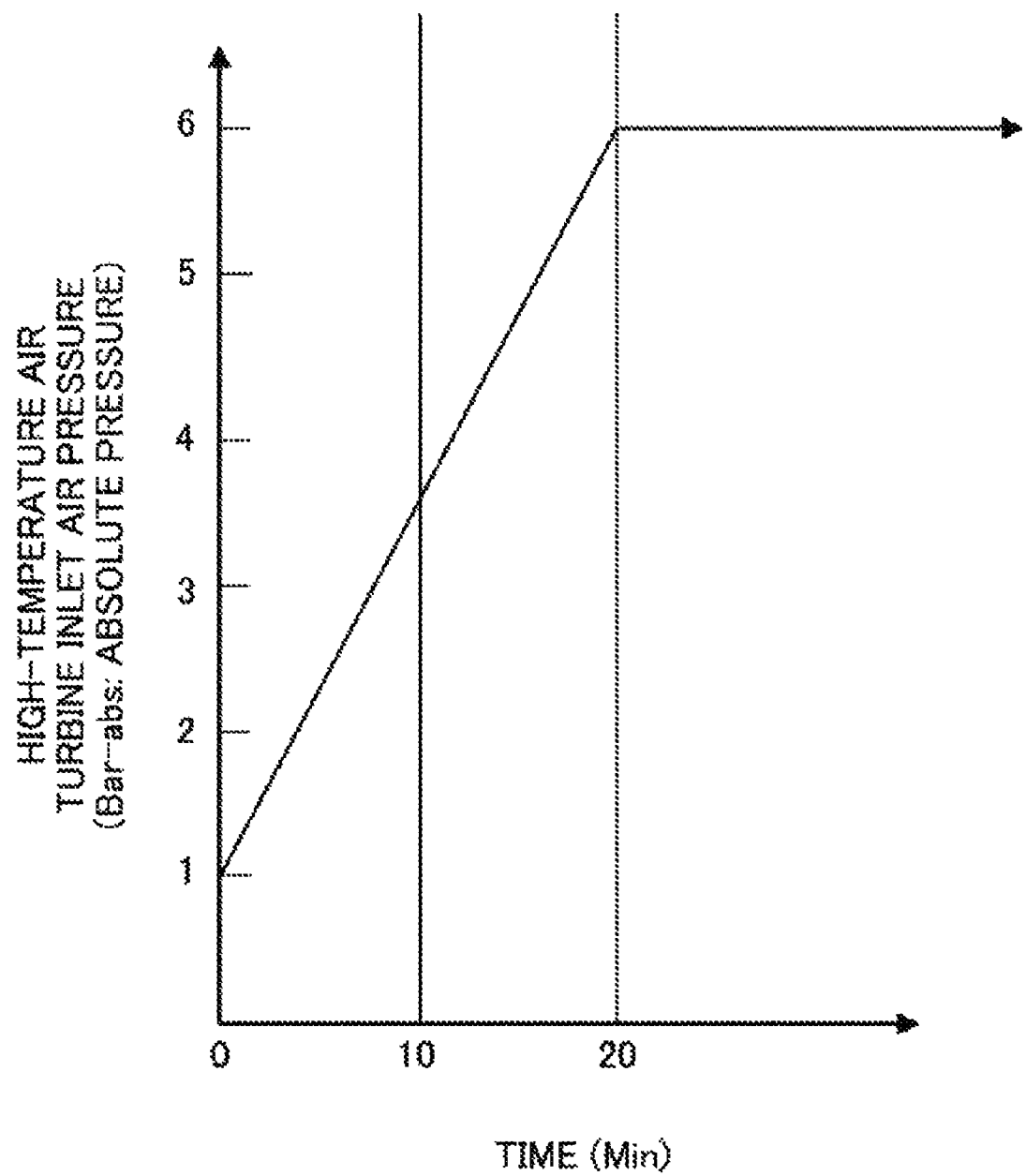
FIG. 2 is a characteristic conceptual diagram showing the characteristics of high-temperature air turbine inlet pressure with respect to the startup time of a compressor in the first embodiment of the solar thermal power generation system according to the present invention.

Next, the compression characteristics of the first compressor 86 constituting the first embodiment of the solar thermal power generation system according to the present invention with respect to its startup time will be explained below with reference to FIG. 2. FIG. 2 is a characteristic conceptual diagram showing the characteristics of the high-temperature air turbine inlet pressure with respect to the startup time of the compressor in the first embodiment of the solar thermal power generation system according to the present invention.

In FIG. 2, the horizontal axis represents the startup time from the time 0 when the first compressor 86 is started, while the vertical axis represents the high-temperature air turbine inlet air pressure (absolute pressure). In this example, a compressor having a pressure ratio of approximately 6 was selected as the first compressor 86.

While inlet pressure of the first compressor 86 becomes slightly lower than the atmospheric pressure since the intake air passes through the first intake air inlet filter 73, the air drier 168, etc. shown in FIG. 1, the pressure drop is sufficiently small and the inlet pressure is approximately 1 bar-abs (absolute pressure) which is substantially equal to the atmospheric pressure. Thus, before the start of the first compressor 86 (0 on the horizontal axis), the high-temperature air turbine inlet air pressure (absolute pressure) remains at approximately 1 bar-abs (absolute pressure).

As shown in FIG. 2, the high-temperature air turbine inlet air pressure (absolute pressure) is boosted from 1 bar-abs (absolute pressure) to approximately 6 bar-abs (absolute pressure) in about 20 minutes from the start of the first compressor 86. While the air discharged from the outlet of the first compressor 86 undergoes a slight pressure drop when passing through the regenerator 65 and the secondary heat medium heater 47, the air pressure is approximately 6 bar-abs (absolute pressure) at the inlet of the high-temperature air turbine 56.

Figure 3:
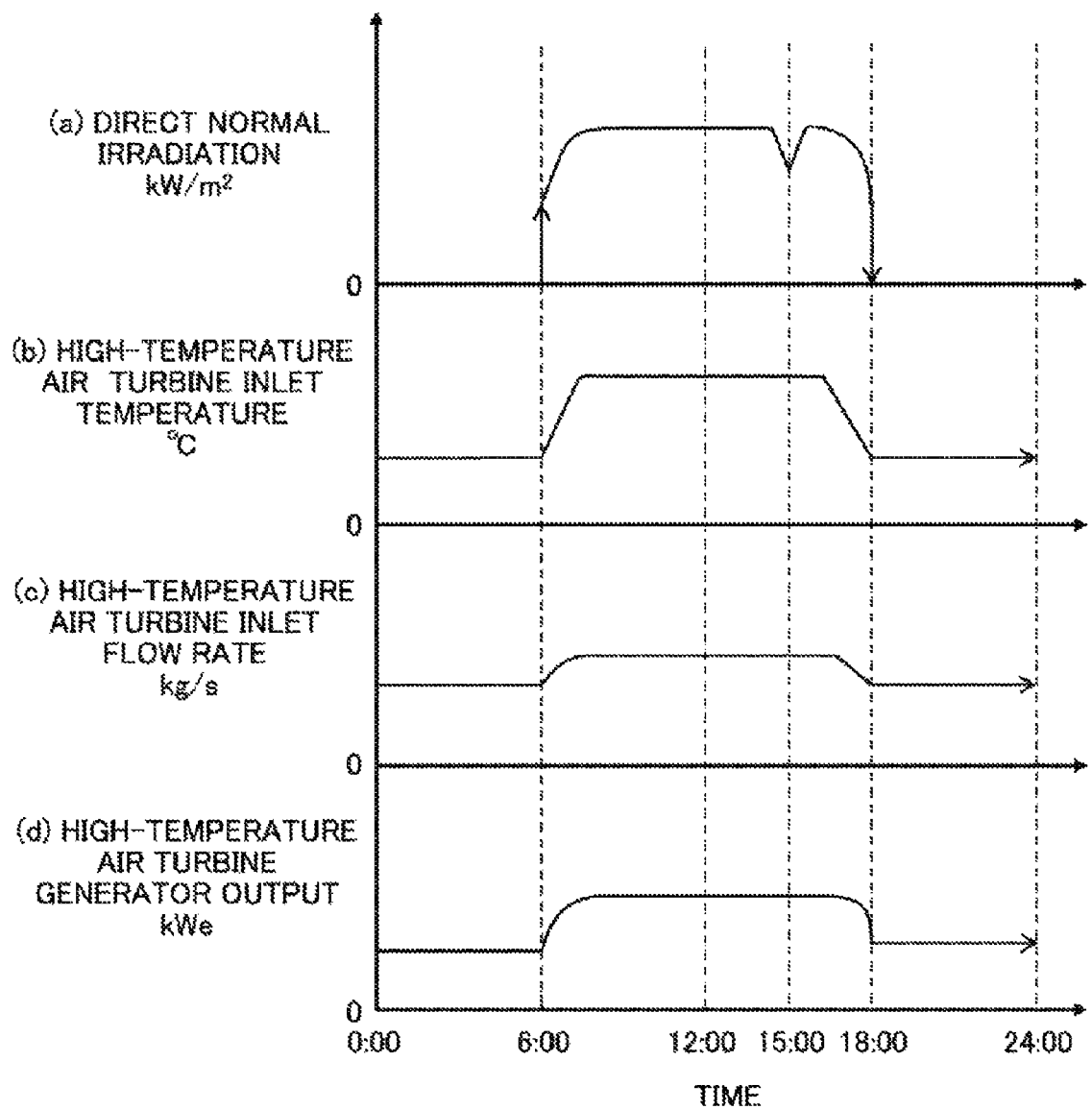
FIG. 3 is a characteristic conceptual diagram showing the characteristics of high-temperature air turbine inlet temperature, a high-temperature air turbine inlet flow rate, and high-temperature air turbine generator output with respect to the change in direct normal irradiation in a day in the first embodiment of the solar thermal power generation system according to the present invention.

Next, the change in the high-temperature air turbine generator output, etc. with respect to the change in the direct normal irradiation in a day in the first embodiment of the solar thermal power generation system according to the present invention will be explained below with reference to FIG. 3. FIG. 3 is a characteristic conceptual diagram showing the characteristics of the high-temperature air turbine inlet temperature, the high-temperature air turbine inlet flow rate, and the high-temperature air turbine generators output with respect to the change in the direct normal irradiation in a day in the first embodiment of the solar thermal power generation system according to the present invention.

In FIG. 3, the horizontal axis represents the time of day, while the vertical axis represents (a) direct normal irradiation [kW/m$^2$], (b) high-temperature air turbine inlet temperature signal [° C.], (c) high-temperature air turbine inlet flow rate signal [kg/s], and (d) high-temperature air turbine generators output signal [kWe].

The (a) direct normal irradiation [kW/m$^2$] in FIG. 3 shows that the collection of direct solar radiation (direct normal irradiation) becomes possible from around 6 a.m. The high-temperature air turbine inlet temperature signal and the high-temperature air turbine inlet flow rate signal start rising at the same time as shown in the graphs (b) and (c). The generator output of the generator 145 connected to the high-temperature air turbine 56 takes on the maximum power (rated power) around noon as shown in the graph (d).

Thereafter, a sharp drop (sudden drop) occurred in the (a) direct normal irradiation in FIG. 3 around 3 p.m. This kind of sharp drop is caused by interruption of sunlight due to passage of clouds in the sky, for example. In this embodiment, even with such a sharp drop in the direct normal irradiation, the (b) high-temperature air turbine inlet temperature signal and the (c) high-temperature air turbine inlet flow rate signal do not drop sharply as shown in FIG. 3, by which operation with stable high-temperature air turbine generators output is provided. This is because the primary high-temperature heat medium tank (high-temperature tank) 25 constituting this embodiment has a high heat capacity and high heat inertia.

Figure 4:
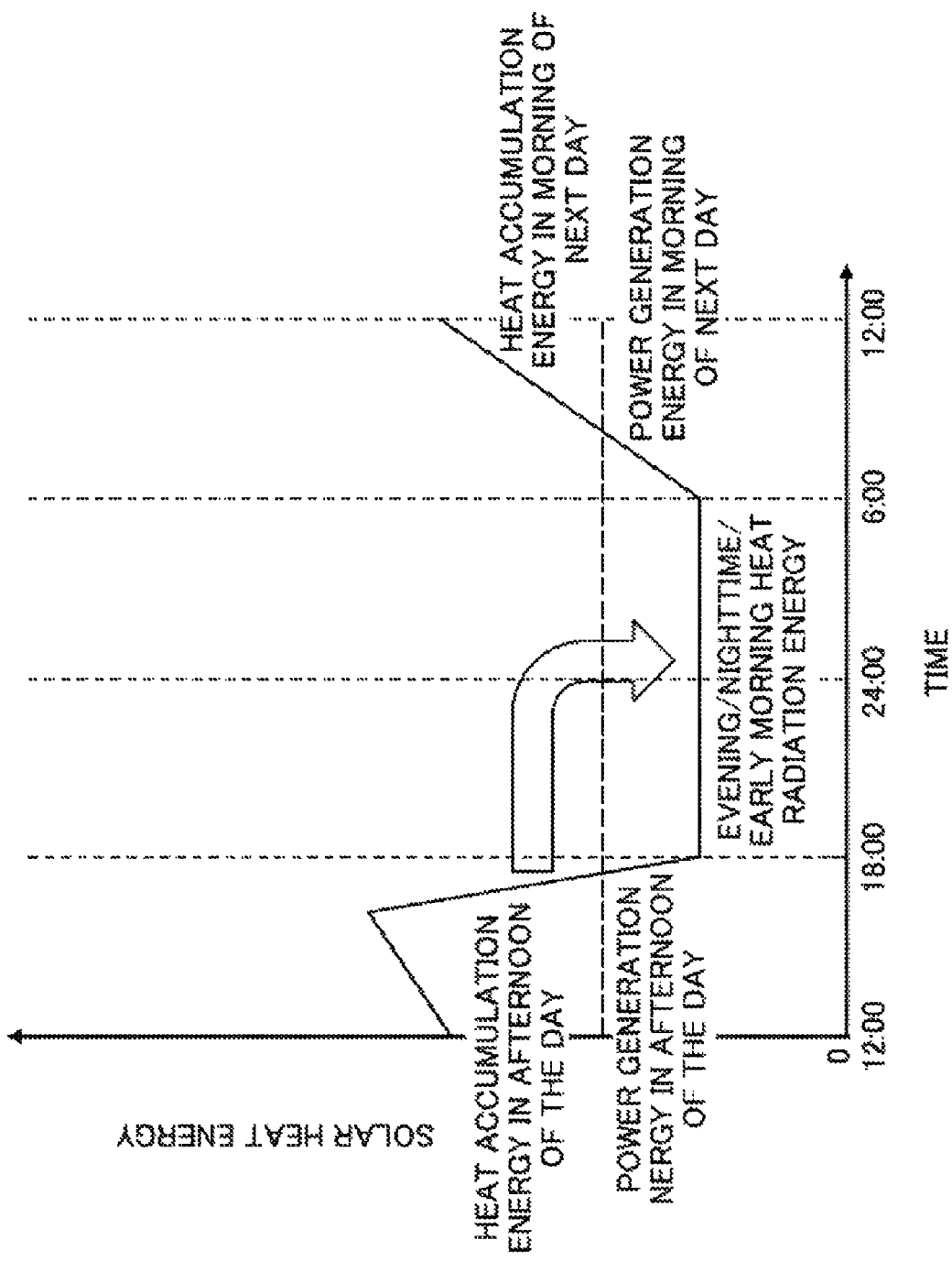
FIG. 4 is a characteristic conceptual diagram showing the operational configuration of solar heat energy in a day in the first embodiment of the solar thermal power generation system according to the present invention.

Next, the operational configuration of the solar heat energy in a day in the first embodiment of the solar thermal power generation system according to the present invention will be explained below with reference to FIG. 4. FIG. 4 is a characteristic conceptual diagram showing the operational configuration of the solar heat energy in a day in the first embodiment of the solar thermal power generation system according to the present invention.

In FIG. 4, the horizontal axis represents the time of day, while the vertical axis represents the solar heat energy. FIG. 4 indicates overall time variations of heat accumulation energy, power generation energy and heat radiation energy (heat release energy) in a day. Specifically, the solar heat is collected in the time period from 6 a.m. to 6 p.m. in which the hourly sunshine duration is long, approximately half of the collected energy is stored as the heat accumulation energy, and the remaining half of the collected energy is used as the power generation energy in the daytime.

The heat accumulation energy over the broken line in FIG. 4 is used in the nighttime as the heat radiation energy (heat release energy) to generate the high-temperature air, with which the high-temperature air turbine 56 is driven, the generator 145 is driven, and the power generation is carried out. The power generation energy and the heat radiation energy under the broken line in FIG. 4 represent the solar heat energy used for the power generation.

By the above-described first embodiment of the solar thermal power generation system according to the present invention, systems in the solar thermal power generation plant can be simplified and a solar thermal power generation system achieving reduction in the construction cost and the power generation cost can be provided.

Further, by the above-described embodiment of the solar thermal power generation system according to the present invention, variations in the heat energy caused by sudden changes in the direct normal irradiation can be absorbed. Therefore, stable solar thermal power generation can be carried out and the unit construction cost and the power generation cost can be reduced to levels equivalent to or lower than those of photovoltaic power generation equipment (solar power generation equipment). Consequently, an economical solar thermal power generation system capable of supplying stable electric power can be provided.

Second Embodiment

Figure 5:
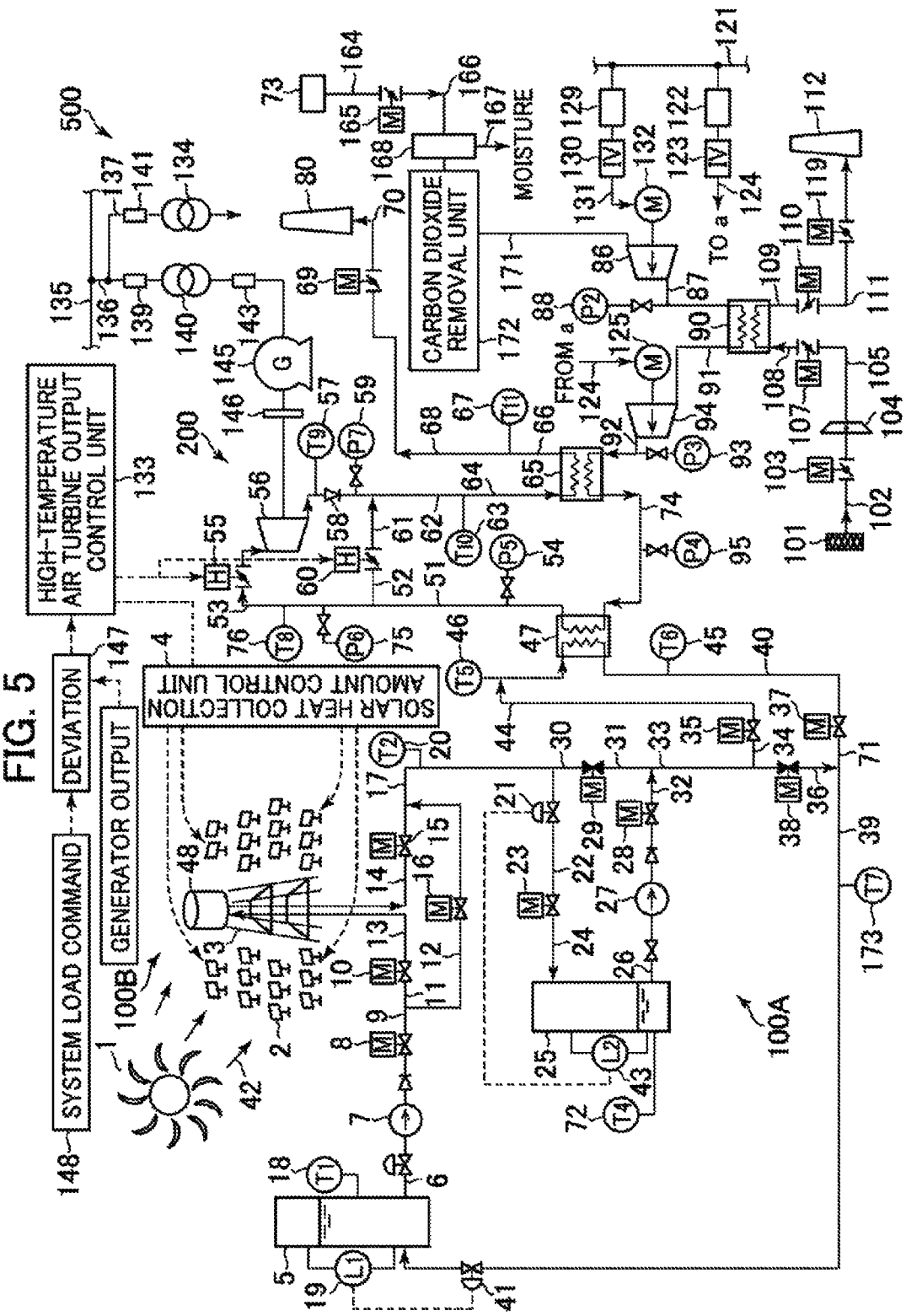
FIG. 5 is a conceptual diagram showing the configuration of a second embodiment of the solar thermal power generation system according to the present invention.
Figure 6:
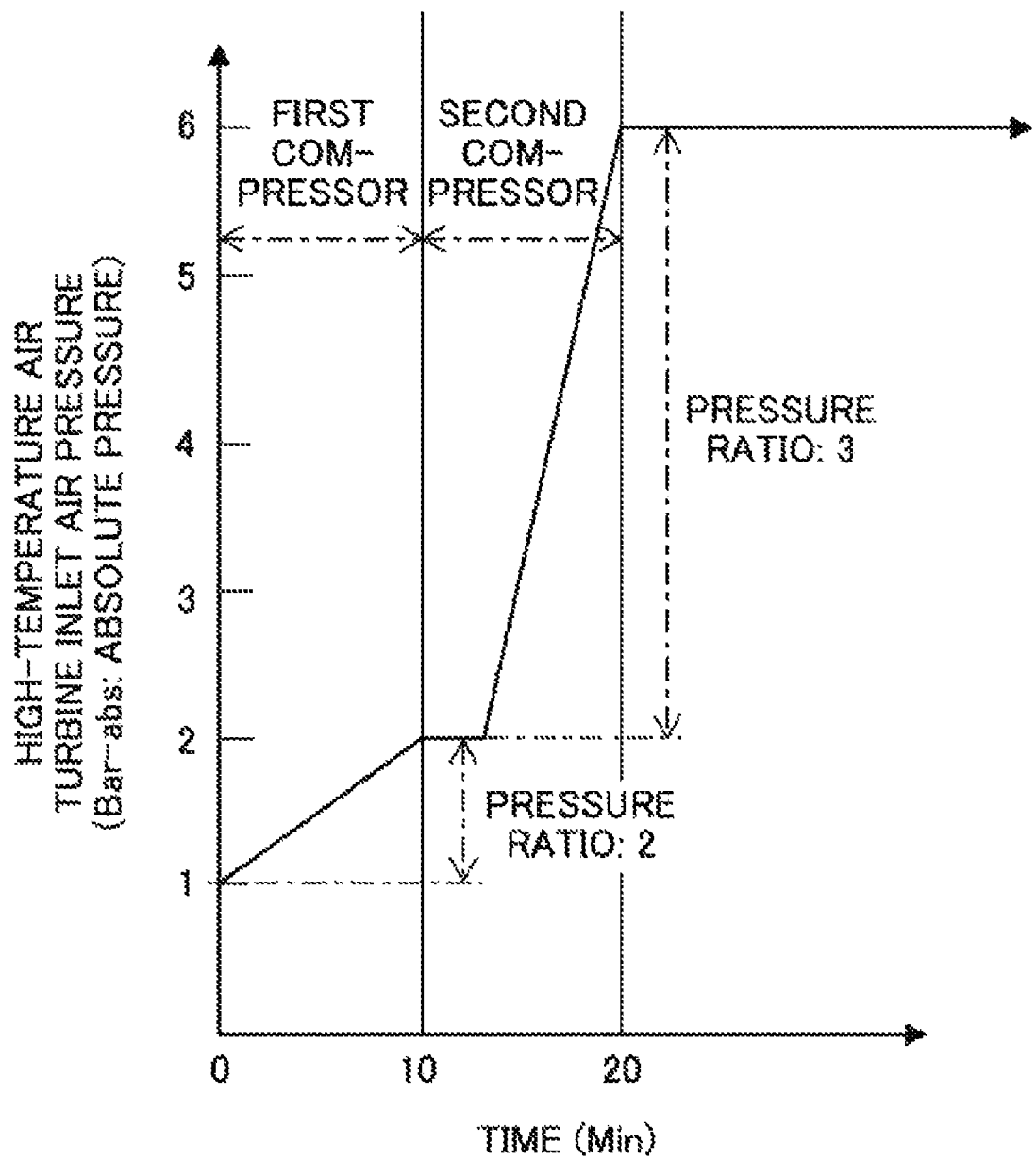
FIG. 6 is a characteristic conceptual diagram showing the characteristics of the high-temperature air turbine inlet pressure with respect to the startup time of the compressor in the second embodiment of the solar thermal power generation system according to the present invention.
Figure 7:
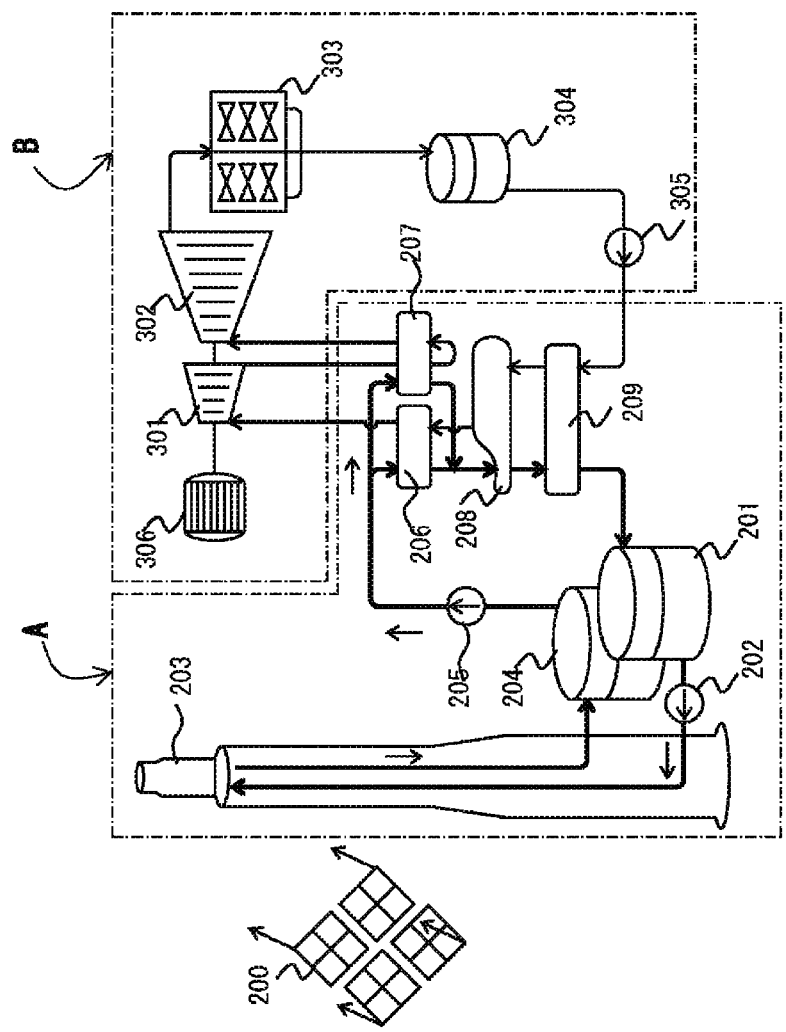
FIG. 7 is a conceptual diagram showing the configuration of a conventional solar thermal power generation plant.

A second embodiment of the solar thermal power generation system according to the present invention will be described below with reference to figures. FIG. 5 is a conceptual diagram showing the configuration of the second embodiment of the solar thermal power generation system according to the present invention. FIG. 6 is a characteristic conceptual diagram showing the characteristics of the high-temperature air turbine inlet pressure with respect to the startup time of the compressor in the second embodiment of the solar thermal power generation system according to the present invention. Reference characters in FIGS. 5 and 6 identical with those in FIGS. 1-4 represent elements equivalent to those in FIGS. 1-4, and thus detailed explanation thereof is omitted for brevity.

In the second embodiment of the solar thermal power generation system according to the present invention, the configuration of the solar thermal power generation system is basically equivalent to that in the first embodiment. However, the compressor/high-temperature turbine power generation device 200 in this embodiment is configured to have two air compressors as shown in FIG. 5. The compressor/high-temperature turbine power generation device 200 includes a first compressor 86 which compresses air from the atmospheric pressure to a prescribed pressure ratio, a first intercooler 90 which cools down the compressed air discharged from the first compressor 86, and a second compressor 94 which draws in the compressed air cooled down by the first intercooler 90 and compresses the cooled air to a prescribed pressure ratio.

The compression characteristics of the compressors constituting the second embodiment of the solar thermal power generation system according to the present invention with respect to the startup time will be explained below with reference to FIG. 6. In FIG. 6, the horizontal axis represents the startup time from the time 0 when the first compressor 86 is started, while the vertical axis represents the high-temperature air turbine inlet air pressure (absolute pressure). In this example, a compressor having a pressure ratio of approximately 2 was selected as the first compressor 86, and a compressor having a pressure ratio of approximately 3 was selected as the second compressor 94.

While inlet pressure of the first compressor 86 becomes slightly lower than the atmospheric pressure since the intake air passes through the first intake air inlet filter 73, the air drier 168, etc. shown in FIG. 5, the pressure drop is sufficiently small and the inlet pressure is approximately 1 bar-abs (absolute pressure), which is substantially equal to the atmospheric pressure. Thus, before the start of the first compressor 86 (0 on the horizontal axis), the high-temperature air turbine inlet air pressure (absolute pressure) remains at approximately 1 bar-abs (absolute pressure).

As shown in FIG. 6, the high-temperature air turbine inlet air pressure (absolute pressure) is boosted from 1 bar-abs (absolute pressure) to approximately 1×2=2 bar-abs (absolute pressure) in about 10 minutes from the start of the first compressor 86. Thereafter, the high-temperature air turbine inlet air pressure (absolute pressure) is boosted by the second compressor 94 from 2 bar-abs (absolute pressure) to approximately 2×3=6 bar-abs (absolute pressure) in about 20 minutes from the start of the first compressor 86. While the air discharged from the outlet of the first compressor 86 undergoes a slight pressure drop when passing through the first intercooler 90, the regenerator 65 and the secondary heat medium heater 47, the air pressure is approximately 6 bar-abs (absolute pressure) at the inlet of the high-temperature air turbine 56 similarly to the first embodiment.

With the above configuration dividing the compressor into two stages and employing the first intercooler 90 for cooling down the air compressed by the first compressor 86, the inlet air temperature of the second compressor 94 can be lowered and the power consumption of the second compressor 94 can be reduced significantly. Such a system dividing the compressor into two stages and performing the intercooling, rather than compressing air with only one compressor, provides a significant effect in reducing the total compressor power consumption.

Incidentally, while a configuration employing two compressors has been shown in this embodiment, the number of compressors is not limited to two. It is desirable to determine the optimum number of compressors in comprehensive consideration of planned air pressure, performance of the compressors, performance of the high-temperature air turbine, and economic efficiency of each device.

Next, the configuration of the compressor/high-temperature turbine power generation device 200 differing from that in the first embodiment will be explained below with reference to FIG. 5. As mentioned above, the first intercooler 90 is arranged between the two compressors in this embodiment. As shown in FIG. 5, air to be used as the heat medium for cooling down the compressed air in the first intercooler 90 is taken in from the atmosphere through a second intake air inlet filter 101 and then sucked in by a cooling fan 104 via an intake air inlet filter outlet pipe 102 and a cooling fan inlet butterfly valve 103. The air compressed by the cooling fan 104 flows through a cooling fan outlet pipe 105, a first intercooler cooling air inlet valve 107 and a first intercooler cooling air inlet pipe 108, and then flows into the first intercooler 90.

The air flowing into the first intercooler 90 cools down the outlet air of the first compressor 86, flows downstream through a first intercooler cooling air outlet pipe 109, a first intercooler cooling air outlet valve 110 and a first intercooler cooling air outlet valve outlet pipe 111, flows into a cooling air outlet discharge tower 112 via a cooling air outlet discharge tower inlet valve 119, and is discharged to the atmosphere.

The outlet air which has been compressed by the first compressor 86 to 2 bar-abs (absolute pressure) flows through the first compressor outlet pipe 87, flows into the first intercooler 90, and is cooled down by means of heat exchange using the air supplied from the cooling fan 104 as the cooling medium. The outlet air cooled down by the first intercooler 90 flows through a first intercooler outlet pipe 91 and is supplied to the second compressor 94. The outlet air which has been compressed by the second compressor 94 to 6 bar-abs (absolute pressure) is sent to the regenerator 65 via a second compressor outlet pipe 92. The second compressor outlet pipe 92 is equipped with a pressure sensor 93 for detecting the outlet air pressure of the second compressor 94. The performance of the second compressor 94 is monitored by using the pressure sensor 93.

In the in-house electric system 121, a second compressor motor 125 (second electric motor) for driving the second compressor 94 is supplied with frequency-converted electric power from a second compressor motor inverter unit 123 via a second compressor motor electric circuit 124. The second compressor motor inverter unit 123 is supplied with the in-house electric power from the in-house electric system 121 via a second compressor breaker 122.

With this configuration, revolution speed control of the second compressor motor 125 becomes possible, and revolution speed control operation becomes possible from the startup of the second compressor 94 to the partial load operation, and further to the full load operation (rated load operation). Consequently, the power consumption of the second compressor 94 can be reduced.

By the above-described second embodiment of the solar thermal power generation system according to the present invention, effects similar to those of the first embodiment can be achieved.

Further, by the above-described second embodiment of the solar thermal power generation system, thanks to the configuration dividing the compressor into two stages and employing the first intercooler 90 for cooling down the air compressed by the first compressor 86, the inlet air temperature of the second compressor 94 can be lowered and the power consumption of the second compressor 94 can be reduced significantly. Consequently, the total compressor power consumption can be reduced and a solar thermal power generation system achieving further reduction in the power generation cost can be provided.

While this embodiment has been described by using an example in which air is used as the coolant of the first intercooler 90, other materials such as seawater and fresh water may also be used.

It is to be noted that the present invention is not limited to the aforementioned embodiments, but covers various modifications. While, for illustrative purposes, those embodiments have been described specifically, the present invention is not necessarily limited to the specific forms disclosed. For example, while the above embodiments have been described by using examples in which molten salt is used as the primary heat medium, the solar heat collection/accumulation/radiation power generation can be conducted in a similar manner also by using synthetic oil as the primary heat medium. In this case, the temperature at which the synthetic oil is usable is limited by an upper limit temperature of approximately 430° C., and thus the inlet temperature of the high-temperature air turbine drops (approximately 420° C. at the maximum) compared to the case where molten salt is used as the primary heat medium. However, configuring such a solar thermal power generation system employing synthetic oil as the primary heat medium is possible since the high-temperature air turbine can be driven even in such a temperature range.

DESCRIPTION OF REFERENCE CHARACTERS

1: Sun
2: Heliostat (sunlight reflecting mirror)
3: Tower
4: Solar heat collection amount control unit
5: Primary low-temperature heat medium tank (low-temperature tank)
18: Temperature sensor (primary low-temperature heat medium tank temperature)
19: Liquid level sensor (primary low-temperature heat medium tank liquid level)
20: Temperature sensor (heat collector outlet primary high-temperature heat medium temperature)
25: Primary high-temperature heat medium tank (high-temperature tank)
42: Direct normal irradiation
43: Liquid level sensor (primary high-temperature heat medium tank liquid level)
45: Temperature sensor (secondary heat medium heater outlet primary heat medium temperature)
46: Temperature sensor (secondary heat medium heater inlet primary heat medium temperature)
47: Secondary heat medium heater
48: Heat collector
55: High-temperature air turbine inlet butterfly valve
56: High-temperature air turbine
57: Temperature sensor (high-temperature air turbine outlet air temperature)
58: High-temperature air turbine exhaust check valve
59: Pressure sensor (high-temperature air turbine exhaust check valve outlet pressure)
60: High-temperature air turbine bypass butterfly valve
65: Regenerator
72: Temperature sensor (primary high-temperature heat medium tank liquid temperature)
75: Pressure sensor (high-temperature air turbine inlet pressure)
76: Temperature sensor (high-temperature air turbine inlet temperature)
86: First compressor
88: Pressure sensor (first compressor outlet pressure)
90: First intercooler
93: Pressure sensor (second compressor outlet pressure)
94: Second compressor
100A: Primary system (solar heat accumulation/radiation device)
100B: Primary system (solar heat collection device)
104: Cooling fan
121: In-house electric system
122: Second compressor breaker
123: Second compressor motor inverter unit
125: Second compressor motor (second electric motor)
129: First compressor breaker
130: First compressor motor inverter unit
132: First compressor motor (electric motor, first electric motor)
133: High-temperature air turbine output control unit
145: Generator
168: Air drier
172: Carbon dioxide removal unit
200: Secondary system (compressor/high-temperature turbine power generation device)

What is claimed is:
1. A solar thermal power generation system comprising:
a solar heat collection device which collects solar heat and thereby heats up molten salt as a primary heat medium;
a solar heat accumulation/radiation device including a low-temperature tank which stores molten salt to be supplied to the solar heat collection device, a high-temperature tank which stores high-temperature molten salt heated by the solar heat collection device, and a secondary heat medium heater which heats up a secondary heat medium by using the high-temperature molten salt supplied from the high-temperature tank as a heating medium; and
a compressor/high-temperature turbine power generation device including a compressor which generates compressed air as the secondary heat medium by compressing air taken in from the atmosphere to a prescribed pressure, a high-temperature air turbine which drives a generator by taking in the compressed air heated by the secondary heat medium heater, and a line connected to the at least one compressor and the high-temperature air turbine;
an electric motor which drives the at least one compressor;
an inverter which supplies power to the electric motor, wherein the electric motor receives revolution speed control from the inverter;

a bypass system which leads the compressed air heated by the secondary heat medium heater to a high-temperature air turbine exhaust header pipe while bypassing the high-temperature air turbine, the bypass system being branched from the line;

a bypass valve for adjusting flow rate of the compressed air flowing through the bypass system;

an inlet valve for adjusting flow rate of the compressed air flowing into the high-temperature air turbine; and a control unit regulating the flow rate and pressure of the compressed air to be introduced to the high-temperature air turbine at predetermined values by adjusting open angles of the bypass valve and the inlet valve.

2. The solar thermal power generation system according to claim 1, wherein the compressor/high-temperature turbine power generation device includes:

the compressor which compresses air taken in from the atmosphere;

an intercooler which cools down the compressed air discharged from the compressor; and another compressor which takes in the compressed air cooled down by the intercooler and compresses the cooled air to a prescribed pressure.

3. The solar thermal power generation system according to claim 1, further comprising a regenerator which is arranged upstream of a channel on the secondary heat medium side of the secondary heat medium heater and heats up the compressed air by using exhaust air from the high-temperature air turbine as a heating medium.

4. The solar thermal power generation system according to claim 1, wherein a drier which dries intake air by removing water vapor in the intake air is arranged on the air intake side of the compressor for compressing the air taken in from the atmosphere.

5. The solar thermal power generation system according to claim 1, wherein a carbon dioxide removal unit which removes carbon dioxide from intake air is arranged on the air intake side of the compressor for compressing the air taken in from the atmosphere.

6. The solar thermal power generation system according to claim 2, comprising:

a first electric motor which drives the compressor;

a first inverter which supplies power to the first electric motor;

a second electric motor which drives the other compressor; and a second inverter which supplies power to the second electric motor, wherein the first and second electric motors receive revolution speed control from the first and second inverters, respectively.

* * * * *